(12) United States Patent
Sakurai et al.

(10) Patent No.: US 11,440,591 B2
(45) Date of Patent: Sep. 13, 2022

(54) VEHICLE BODY STRUCTURE OF CONVERTIBLE VEHICLE

(71) Applicant: TOYOTA JIDOSHA KABUSHIKI KAISHA, Aichi-ken (JP)

(72) Inventors: Tomohiro Sakurai, Seto (JP); Kenya Fujimoto, Toyota (JP); Satoshi Ogawa, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 38 days.

(21) Appl. No.: 16/593,067

(22) Filed: Oct. 4, 2019

(65) Prior Publication Data
US 2020/0108871 A1    Apr. 9, 2020

(30) Foreign Application Priority Data
Oct. 9, 2018  (JP) .............................. JP2018-190953

(51) Int. Cl.
| | | |
|---|---|---|
| *B62D 21/15* | (2006.01) | |
| *B62D 25/04* | (2006.01) | |
| *B62D 25/02* | (2006.01) | |
| *B62D 25/08* | (2006.01) | |
| *B62D 27/02* | (2006.01) | |
| *B62D 25/20* | (2006.01) | |

(52) U.S. Cl.
CPC ......... *B62D 21/152* (2013.01); *B62D 25/025* (2013.01); *B62D 25/04* (2013.01); *B62D 25/08* (2013.01); *B62D 21/15* (2013.01); *B62D 25/2027* (2013.01); *B62D 27/023* (2013.01)

(58) Field of Classification Search
CPC ...... B62D 21/15; B62D 25/08; B62D 25/025; B62D 25/04; B62D 27/023; B62D 25/2027
USPC ..................................... 296/187.11
See application file for complete search history.

(56) References Cited

U.S. PATENT DOCUMENTS

| | | | | |
|---|---|---|---|---|
| 5,228,741 A | * | 7/1993 | Ide ........................ | B62D 21/152 296/187.11 |
| 7,413,240 B2 | * | 8/2008 | Rashidy ................. | B62D 25/00 296/187.12 |
| 7,938,446 B2 | * | 5/2011 | Schmitt ............... | B62D 25/2009 296/102 |
| 8,678,481 B2 | * | 3/2014 | Tamura ................ | B62D 25/025 296/193.05 |

(Continued)

FOREIGN PATENT DOCUMENTS

| | | |
|---|---|---|
| CN | 101143601 A | 3/2008 |
| CN | 101823505 A | 9/2010 |

(Continued)

*Primary Examiner* — D Glenn Dayoan
*Assistant Examiner* — Dana D Ivey
(74) *Attorney, Agent, or Firm* — Hauptman Ham, LLP (57) ABSTRACT

A reinforcement extending in the front-back direction of a vehicle and connecting a rear side member and a center pillar is provided. The reinforcement includes a gusset, an intermediate connecting member, and a pillar-side member. The gusset is connected to the rear side member, and the front end portion of the gusset is connected to the rear surface of the intermediate connecting member. The front surface of the intermediate connecting member is connected to the rear end portion of the pillar-side member. The pillar-side member is connected to the center pillar.

12 Claims, 5 Drawing Sheets

(56) References Cited

U.S. PATENT DOCUMENTS

| | | | |
|---|---|---|---|
| 8,740,290 B2* | 6/2014 | Takayama | B62D 25/2081 |
| | | | 296/193.05 |
| 9,469,347 B1* | 10/2016 | Schnug | B62D 25/04 |
| 2008/0061600 A1* | 3/2008 | Ebina | B62D 21/152 |
| | | | 296/187.12 |
| 2010/0084843 A1 | 4/2010 | Schmitt et al. | |
| 2010/0225145 A1* | 9/2010 | Brunner | B62D 25/02 |
| | | | 296/187.12 |
| 2020/0039586 A1 | 2/2020 | Ayuzawa | |

FOREIGN PATENT DOCUMENTS

| | | | |
|---|---|---|---|
| JP | 2008-068671 A | | 3/2008 |
| JP | 2013-028322 A | | 2/2013 |
| JP | 2013028322 A | * | 2/2013 |
| JP | 2015107763 A | | 6/2015 |
| WO | 2018078989 A1 | | 5/2018 |

* cited by examiner

VEHICLE BODY STRUCTURE OF CONVERTIBLE VEHICLE

CROSS REFERENCE TO RELATED APPLICATION

This application claims priority to Japanese Patent Application No. 2018-190953 filed on Oct. 9, 2018, which is incorporated herein by reference in its entirety including the specification, claims, drawings, and abstract.

TECHNICAL FIELD

The present disclosure relates to a vehicle body structure of a convertible vehicle.

BACKGROUND

Conventionally, there has been suggested a vehicle body structure for preventing deformation of a vehicle body due to a load inputted to the vehicle body.

For example, JP 2013-28322A discloses a vehicle body structure including right and left quarter members extending to rearward of the vehicle from the respective upper end portions of right and left center pillars, a lower back panel extending in the vehicle width direction between the respective rear end portions of the right and left quarter members, and strut towers disposed between the lower back panel and the respective right and left quarter members. In this vehicle body structure, the right and left quarter members and the lower back panel, together forming a C-shape, function as a stabilizer so that the vehicle body can be saved from being twisted or deformed by a thrusting-up load inputted from the strut towers.

JP 2008-68671A discloses a vehicle body structure in which right and left rear side members are connected to each other via a rear end cross member, the respective front end portions of the right and left rear side members are connected to side sills, body side bars extending in the front-back direction of the vehicle above the respective rear side members are connected to the respective right and left end portions of the rear end cross member via respective connection bars, and side door bars are disposed between the respective body side bars and the center pillars. According to this vehicle structure, a load inputted into the rear end cross member at a rear collision is transmitted from the rear side members to the side sills and also to the center pillars via the connection bars, the body side bars, and the side door bars. This structure increases the amount of load to be absorbed in a rear collision.

Note here that convertible vehicles have been conventionally known. In this specification, convertible vehicles refer to a concept including vehicles whose roofs can be opened and closed and vehicles having no roof. A convertible vehicle can be in a condition without a roof that can serve as a framework of the body. Thus, in a rear collision, no load transmitting path will be formed from the roof to the center pillar (or a front pillar), and the load inputted into the vehicle will be transmitted mainly through a load transmitting path extending from the rear side member to the rocker (the side sill). This causes a problem in that a load will not be dispersed in a convertible vehicle at a rear collision, which makes the vehicle body easily deformable.

As a means for preventing deformation of the vehicle body of a convertible vehicle in a rear collision, enlargement of the cross section of the side sill is a possibility. However, the side sill needs to have a considerably large cross section in order to implement sufficient effect of preventing deformation of the vehicle body, which leads to a problem of an increase in the weight of the vehicle.

It is an object of this disclosure to reduce the amount of deformation of the vehicle body of a convertible vehicle in a rear collision, while preventing an increase in the weight of the vehicle.

SUMMARY

A vehicle body structure according to this disclosure is a vehicle body structure for a convertible vehicle including a reinforcement extending in the front-back direction of a vehicle, for connecting a rear side member and a center pillar above a rocker.

According to this structure, a load inputted into the rear side member in a rear collision is transmitted from the rear side member to the center pillar via the reinforcement, in addition to being transmitted from the rear side member to the side sill. This transmission disperses the load, thus reducing the amount of deformation of the vehicle body in a rear collision. Further, the reinforcement enables reduction in the amount of deformation of the vehicle body in a rear collision without requiring the side sill of a convertible vehicle to have a large cross section. This makes it possible to reduce the amount of deformation of the vehicle body in a rear collision while preventing an increase in the weight of the convertible vehicle.

The reinforcement may include a gusset connected to the rear side member, a pillar-side member connected to the center pillar, and an intermediate connecting member disposed between the gusset and the pillar-side member in the front-back direction of the vehicle and connected to the gusset and the pillar-side member.

According to this structure, the load inputted into the rear side member at a rear collision is transmitted to the center pillar through a load transmitting path from the rear side member, the gusset, the intermediate connecting member, and the pillar-side member to the center pillar.

The gusset, the intermediate connecting member, and the pillar-side member may respectively have wall portions extending in the front-back direction of the vehicle, and the wall portion of the gusset, the wall portion of the intermediate connecting member, and the wall portion of the pillar-side member may serially extend in the front-back direction of the vehicle.

According to this structure, the wall portion of the gusset, the wall portion of the intermediate connecting member, and the wall portion of the pillar-side member together constitute a serial wall portion extending from the rear side member toward the center pillar. Accordingly, there is formed a serial (that is, no hollow portion) load transmitting path from the rear side member toward the center pillar, thereby improving the load transmission efficiency.

The reinforcement may include a left gusset connected to a left rear side member, a left pillar-side member connected to a left center pillar, a left intermediate connecting member disposed between the left gusset and the left pillar-side member in the front-back direction of the vehicle and connected to the left gusset and the left pillar-side member, a right gusset connected to a right rear side member, a right pillar-side member connected to a right center pillar, a right intermediate connecting member disposed between the right gusset and the right pillar-side member in the front-back direction of the vehicle and connected to the right gusset and the right pillar-side member, and a right-left connecting member for connecting the left intermediate connecting member and the right intermediate connecting member.

According to this structure, in the case where a load is unevenly inputted in the right and left directions in a rear collision, the load can be transmitted through the right-left connecting member to a center pillar on a side with a smaller load inputted. For example, in the case that a greater load is inputted on the right side of the vehicle, the load can be transmitted to the left center pillar through a load transmitting path from the right rear side member, the right gusset, the right intermediate connecting member, the right-left connecting member, the left intermediate connecting member, and the left pillar-side member to the left center pillar. This transmission enables further dispersion of the load, thus reducing the amount of deformation of the vehicle body.

The left end portion of the right-left connecting member may be disposed between the left gusset and the left pillar-side member in the front-back direction of the vehicle and connected to the left gusset and the left pillar-side member, and the right end portion of the right-left connecting member may be disposed between the right gusset and the right pillar-side member in the front-back direction of the vehicle and connected to the right gusset and the right pillar-side member.

According to this structure, the load inputted to the rear side member in a rear collision is transmitted to the center pillar through another load transmitting path from the rear side member, the gusset, the end portion of the right-left connecting member, and the pillar-side member to the center pillar. This transmission enables further dispersion of the load and thus further reduction of the amount of deformation of the vehicle body in a rear collision. Additionally, according to this structure, as the end portion of the right-left connecting member is positioned ahead of the gusset, a load from rearward can be readily inputted to the right-left connecting member via the gusset. This makes it much easier for a load having been inputted unevenly in the right and left directions in a rear collision to be inputted into the right-left connecting member, thus enabling effective transmission of the load in the right-left direction via the right-left connecting member.

The rear side member may be connected to the rear end portion of the rocker of the convertible vehicle, and the intermediate connecting member may be connected to the rear wheel well of the convertible vehicle.

According to this structure, the reinforcement connects the upper body and the under body. This connection further strengthens the connection between the upper body and the under body, thereby improving the rigidity of the body.

The vehicle structure disclosed in this specification enables reduction in the amount of deformation of a vehicle body of a convertible vehicle in a rear collision, while preventing an increase in the weight of the vehicle.

BRIEF DESCRIPTION OF DRAWINGS

Embodiment(s) of the present disclosure will be described by reference to the following figures, wherein.

DESCRIPTION OF EMBODIMENTS

Figure 1:
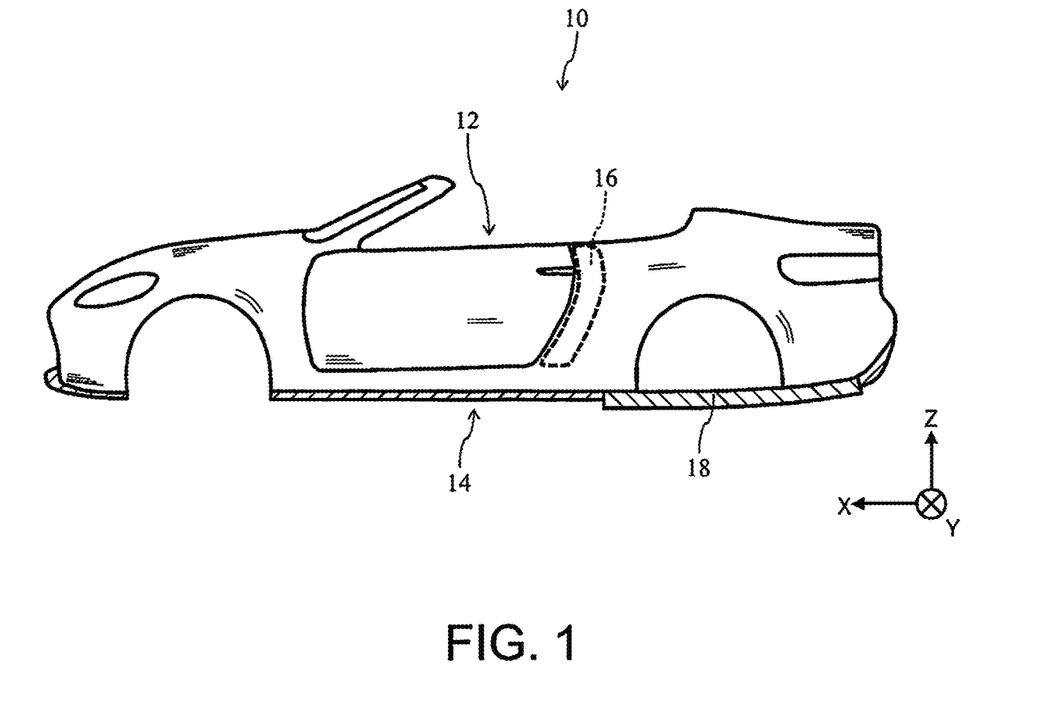
FIG. 1 is a side view of the body of a convertible vehicle.

The structure of a vehicle body of a convertible vehicle according to this embodiment will now be described. FIG. 1 is a side view of a body 10 of a convertible vehicle according to this embodiment. In FIG. 1 (similarly applied to FIG. 2 to FIG. 5), the front-back direction of a vehicle is defined as an X axis (the positive direction of the X axis is the forward direction), the width direction of the vehicle is defined as a Y axis (the positive direction of the Y axis is the rightward direction), and the up-down direction of the vehicle is defined as a Z axis (the positive direction of the Z axis is the upper direction. In this specification, the front-back direction of a vehicle may be simply referred to as front, forward, ahead, or back; the right-left direction when facing forward of a vehicle may be simply referred to as right or left; and the up-down direction of a vehicle may be simply referred to as up, above, down, or below.

The body 10 includes an upper body 12, or an upper portion of the body 10, and an under body 14, or a lower portion of the body 10. The upper body 12 is connected to the under body 14 to together constitute the body 10. The body 10 is supported by a frame that forms a framework of a convertible vehicle.

The upper body 12 includes, for example, a hood, front fenders, front wheel well, rear fenders (quarter panels), rear wheel wells, side bodies (from the front fenders to the rear fenders), and front doors. As a convertible vehicle in this embodiment is a two-seater, one front door is provided on each of the right and left sides of the vehicle. Needless to say, a convertible vehicle may include a rear seat (for example, including four seats).

The upper body 12 includes center pillars 16. The center pillar 16 is a pillar disposed behind and adjacent to the front door and extending in the up-down direction. The center pillar 16 has a function of enhancing, for example, the rigidity of the upper body 12. The center pillar 16 is provided on each of the right and left sides. That is, a right center pillar 16 is disposed behind the right front door, and a left center pillar 16 is disposed behind the left front door.

A convertible vehicle has a roof that can be opened and closed. The roof illustrated in FIG. 1 is opened. The roof in this condition is stored in the rear portion of the upper body 12.

The under body 14 includes, for example, rockers (side sills) and a floor panel. Rockers are members extending in the front-back direction on the respective right and left sides in the lower portion of a vehicle.

A frame is a member made of metal (for example, iron). The frame includes, for example, side members and a plurality of cross members. The side members are members extending in the front-back direction on the respective right and left sides of the convertible vehicle. The cross members are members extending in the width direction of the vehicle and connecting the right and left side members.

FIG. 1 illustrates a rear side member 18, which is a rear portion of the side member. The rear side member 18 is a structural component disposed further rearward than the center pillar 16 and extending in the front-back direction of the vehicle. The rear side member 18 is connected to the under body 14. Specifically, the rear side member 18 is connected to the rear end portion of the rocker. The rear side member 18 is provided on each of the right and left end portions of the vehicle.

Figure 2:
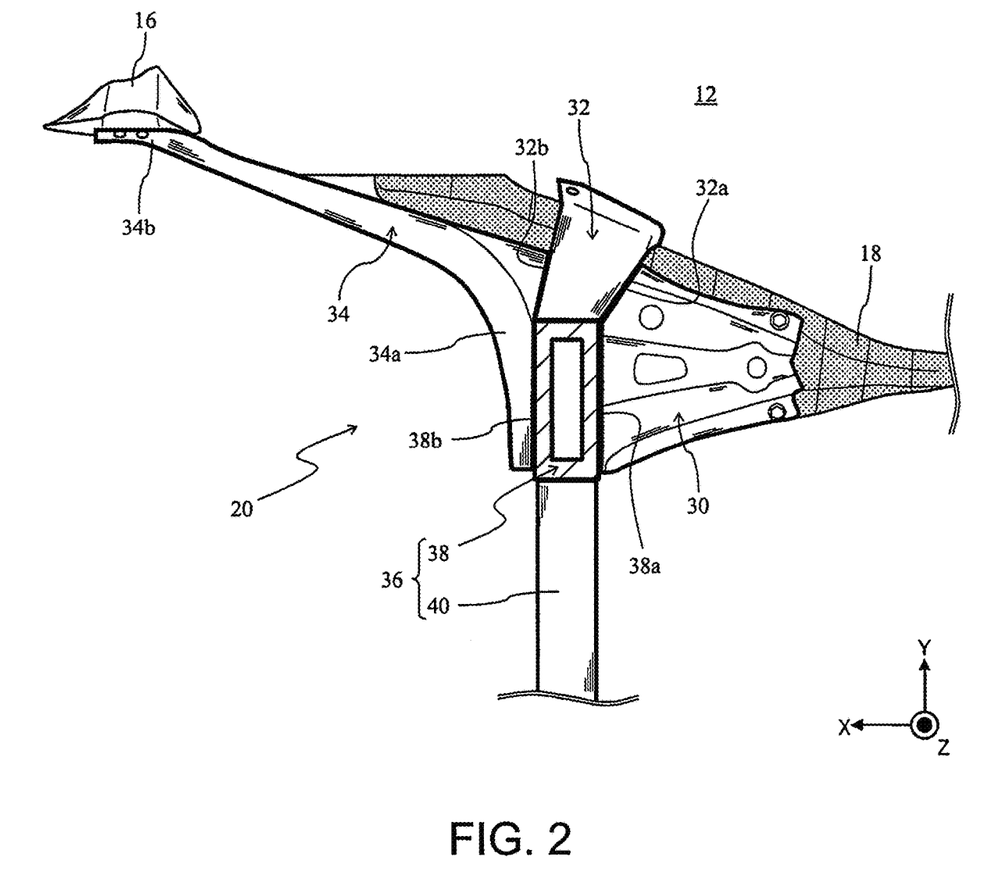
FIG. 2 is a plan view of a reinforcement.
Figure 3:
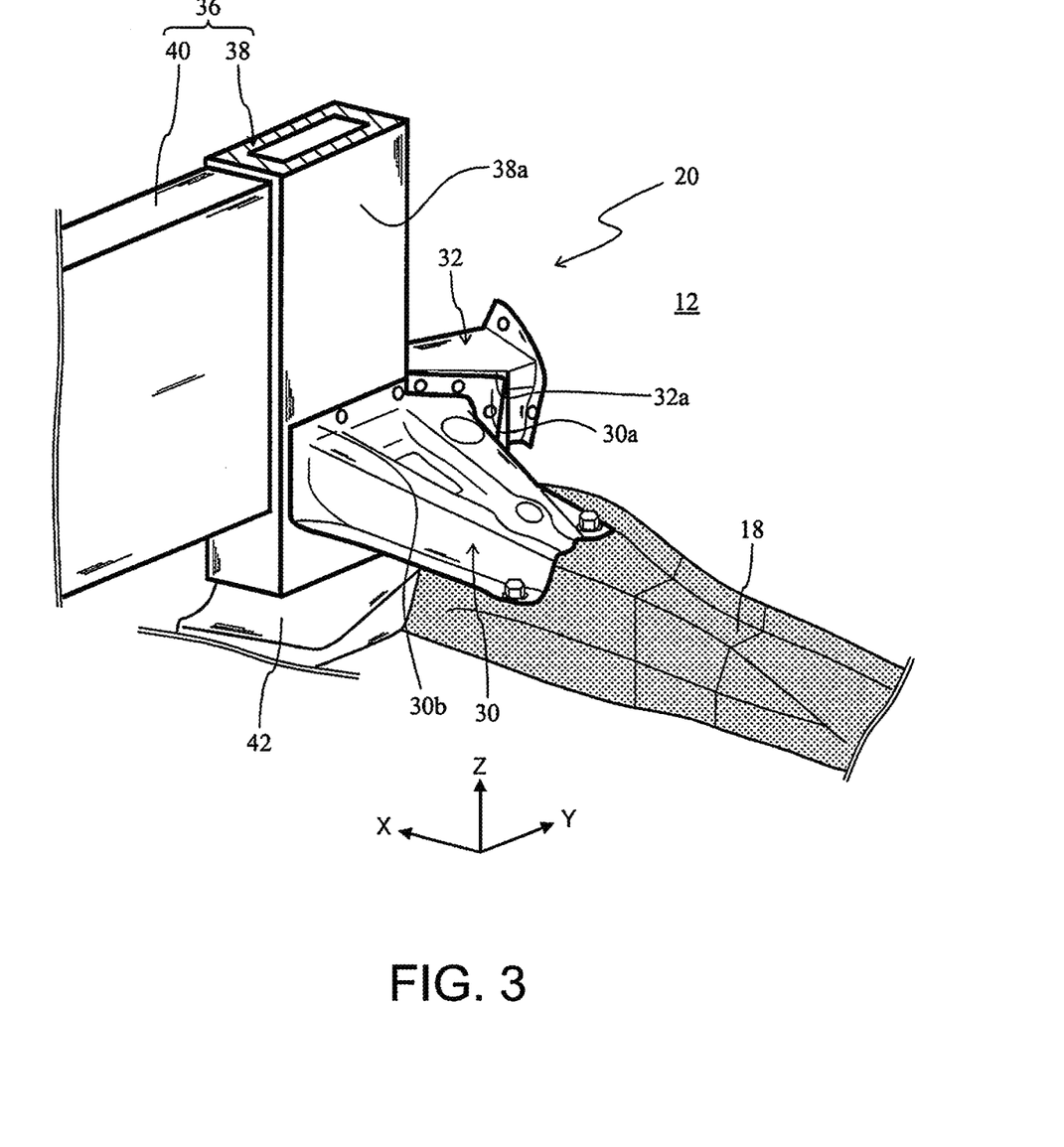
FIG. 3 is a rear perspective view of a reinforcement.
Figure 4:
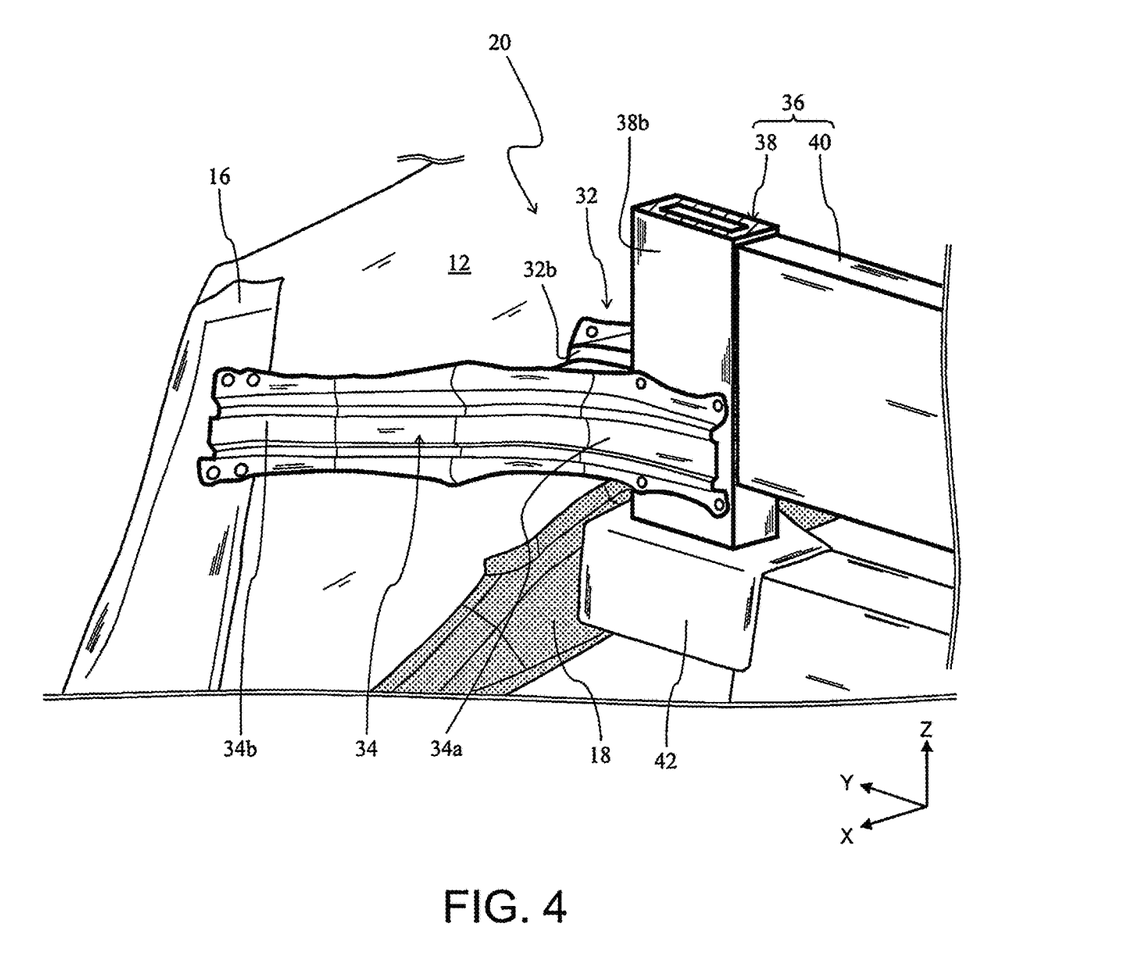
FIG. 4 is a front perspective view of a reinforcement.

FIG. 2 is a plan view of a reinforcement 20 according to this embodiment. FIG. 3 is a rear perspective view of the reinforcement 20. FIG. 4 is a front perspective view of the reinforcement 20. The reinforcement 20 is a member extending in the front-back direction and connecting the rear side member 18 and the center pillar 16. The reinforcement 20 is a member for reinforcing the body 10 and is not included in the body 10. That is, the rear side member 18 is connected to the center pillar 16 via the under body 14 and the upper body 12 (a side body), while the reinforcement 20 connects the rear side member 18 and the center pillar 16 independently of the upper body 12 and the under body 14. The reinforcement 20 is disposed above the rocker of the under body 14.

The reinforcement 20 is disposed between the center pillar 16 and the rear side member 18 in the front-back direction and behind the seat. The reinforcement 20 includes a gusset 30, an intermediate connecting member 32, and a pillar-side member 34.

The gusset 30 is a member positioned on the rear end portion of the reinforcement 20. The gusset 30 is made of metal; in particular, aluminum in this embodiment. The length in the right-left direction of the gusset 30 is such that it becomes longer while going forward such that the gusset 30 has a substantially fan-like shape in a plan view.

The gusset 30 is connected to the rear side member 18 (hatched in FIG. 2 to FIG. 4). Specifically, the rear end portion of the gusset 30 is secured to the rear side member 18 with a bolt. The gusset 30 is also connected to the intermediate connecting member 32. Specifically, as illustrated in FIG. 3, the gusset 30 has a brim 30a on its front end portion, the brim 30a standing in the up-down direction. The brim 30a is connected to a rear surface 32a of the intermediate connecting member 32 with a rivet and through welding.

The intermediate connecting member 32 is a member disposed ahead of the gusset 30 and behind the pillar-side member 34; that is, between the gusset 30 and the pillar-side member 34 in the front-back direction. The intermediate connecting member 32 is made of metal; in particular, aluminum in this embodiment. The intermediate connecting member 32 has a substantially rectangular parallelepiped shape, and has the rear surface 32a, mentioned above, and a front surface 32b.

The intermediate connecting member 32 is connected to the gusset 30, as described above, and also to the pillar-side member 34. Specifically, the front surface 32b of the intermediate connecting member 32 is connected to a rear end portion 34a (the rear surface of the rear end portion 34a) of the pillar-side member 34 with a rivet and through welding. Additionally, the intermediate connecting member 32 is connected to the upper body 12; in particular, to a rear wheel well. Specifically, the right end portion of the intermediate connecting member 32 is secured to the upper body 12 (a rear wheel well) with a bolt.

The pillar-side member 34 is a member positioned on the front end portion of the reinforcement 20. The pillar-side member 34 is made of metal. In this embodiment, the pillar-side member 34 is made of iron. The pillar-side member 34 may be made of high strength iron material. Since iron is stronger than aluminum, the pillar-side member 34 can be described as having higher strength than the gusset 30 and the intermediate connecting member 32. The rear end portion 34a of the pillar-side member 34 bends in the right-left direction such that the rear surface of the rear end portion 34a faces the front surface 32b of the intermediate connecting member 32.

The pillar-side member 34 is connected to the intermediate connecting member 32 as described above and also to the center pillar 16. Specifically, a front end portion 34b of the pillar-side member 34 is secured to the center pillar 16 with a bolt.

The gusset 30, the intermediate connecting member 32, and the pillar-side member 34 are provided on each of the right and left sides of a convertible vehicle. That is, the reinforcement 20 includes a left gusset 30, a left intermediate connecting member 32, and a left pillar-side member 34 to connect a left rear side member 18 and a left center pillar 16, and also a right gusset 30, a right intermediate connecting member 32, and a right pillar-side member 34 to similarly connect a right rear side member 18 and a right center pillar 16. The left gusset 30, the left intermediate connecting member 32, and the left pillar-side member 34, which are not illustrated in FIG. 2 to FIG. 4, have structures identical to those of the right gusset 30, the right intermediate connecting member 32, and the right pillar-side member 34 except that these are symmetrical.

The reinforcement 20 may include a right-left connecting member 36. The right-left connecting member 36 is a member extending in the right-left direction (the vehicle width direction) and connecting the right intermediate connecting member 32 and the left intermediate connecting member 32. The right-left connecting member 36 includes roll bar pillars 38 and a cross member 40. The roll bar pillars 38 constitute the respective right and left end portions of the right-left connecting member 36. The cross member 40 is provided between the left roll bar pillar 38 and the right roll bar pillar 38. The left roll bar pillar 38, not illustrated in FIG. 2 to FIG. 4, has a structure identical to that of the right roll bar pillar 38 except that these are symmetrical.

The roll bar pillar 38 is a barrel member having a rectangular parallelepiped shape extending in the up-down direction. The roll bar pillar 38 has a roll bar penetrating therethrough. The roll bar will project upward to secure safety of an occupant in the case that the convertible vehicle should roll over. The roll bar pillar 38 is made of metal; in particular, aluminum in this embodiment. In detail, the roll bar pillar 38 is made through extrusion molding.

The roll bar pillar 38 is disposed between, and connected to, the gusset 30 and the pillar-side member 34 in the front-back direction. Specifically, as illustrated in FIG. 3, the gusset 30 has another brim 30b on its front end portion, the brim 30b standing in the up-down direction. The brim 30b is connected to a rear surface 38a of the roll bar pillar 38 with a rivet and through welding. As illustrated in FIG. 4, the rear end portion 34a (the rear surface of the rear end portion 34a) of the pillar-side member 34 is connected to a front surface 38b of the roll bar pillar 38 with a rivet and through welding.

As illustrated in FIG. 3 or FIG. 4, the lower end portion of the roll bar pillar 38 is connected to a base member 42. That is, the roll bar pillar 38 is formed standing on the base member 42. The base member 42 as well is made of metal; in particular, aluminum in this embodiment. The base member 42 is connected to the rear side member 18. As described above, since the rear side member 18 is connected to the under body 14, the roll bar pillar 38 is connected to the under body 14 via the base member 42 and the rear side member 18.

As described above, the roll bar pillar 38 is provided on each of the right and left end portions of the right-left connecting member 36. That is, the left roll bar pillar 38 is disposed between, and connected to, the left gusset 30 and the left pillar-side member 34 in the front-back direction, while the right roll bar pillar 38 is disposed between, and connected to, the right gusset 30 and the right pillar-side member 34 in the front-back direction.

The cross member 40 is a member having a rectangular parallelepiped shape extending in the right-left direction. The cross member 40 is made of metal; in particular, aluminum in this embodiment. In detail, the cross member 40 is formed through extrusion molding, similar to the roll bar pillar 38.

As described above, the cross member 40 is connected to the right and left roll bar pillars 38. Specifically, the left surface of the cross member 40 is arc-welded to the right surface of the left roll bar pillar 38, and the right surface of the cross member 40 is arc-welded to the left surface of the right roll bar pillar 38.

A member including the gusset 30, the intermediate connecting member 32, and the right-left connecting member 36 is referred to also as a torsion box.

Figure 5:
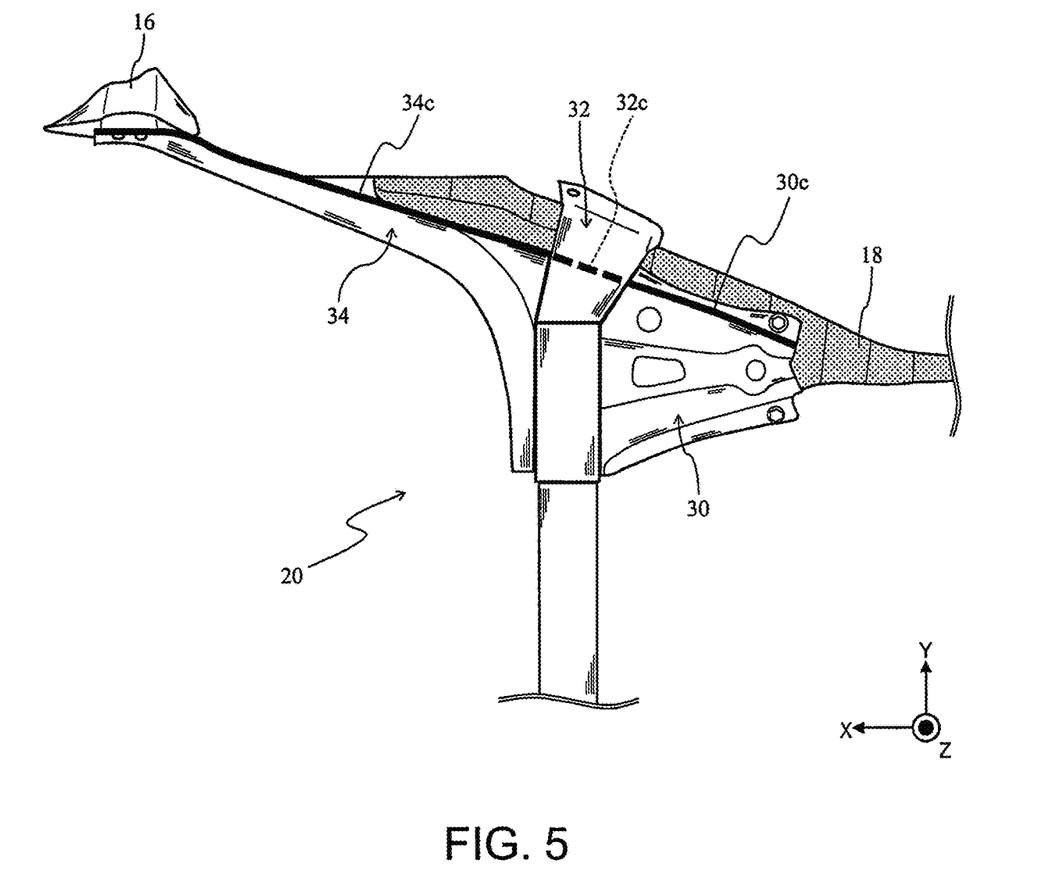
FIG. 5 illustrates a serial wall portion extending from a rear side member toward the center pillar.

As illustrated in FIG. 5, the gusset 30, the intermediate connecting member 32, and the pillar-side member 34 respectively have wall portions 30c, 32c, 34c that stand in the up-down direction and extend in the front-back direction. In this embodiment, the wall portion 30c of the gusset 30 is formed utilizing a step formed outside in the vehicle width direction. The wall portion 32c of the intermediate connecting member 32 is a partition wall provided inside the intermediate connecting member 32. The wall portion 34c of the pillar-side member 34 constitutes the outside surface of the pillar-side member 34 in the vehicle width direction.

The wall portion 30c, the wall portion 32c, and the wall portion 34c serially extend in the front-back direction. Thus, the wall portion 30c, the wall portion 32c, and the wall portion 34c together constitute a serial wall portion extending from the rear side member 18 toward the center pillar 16.

The reinforcement 20, having the structure described above, enables formation of a load transmitting path extending, in this sequence, from the rear side member 18, the gusset 30, the intermediate connecting member 32, and the pillar-side member 34 to the center pillar 16. Through this path, the load inputted into the rear side member 18 in a rear collision is transmitted from the rear side member 18 to the center pillar 16 in addition to being transmitted from the rear side member 18 to the side sill. That is, the load is dispersed. This dispersion enables reduction in the amount of deformation of the vehicle body in a rear collision. The reduction in the amount of deformation of a vehicle body enables, for example, ensuring a space necessary for a fuel tank disposed below the seat to remain as is.

Further, the reinforcement 20 enables reduction in the amount of deformation of the vehicle body in a rear collision without requiring the side sill of a convertible vehicle to have a larger cross section. That is, the reinforcement 20 enables a reduction in the amount of deformation of the vehicle body in a rear collision while preventing an increase in the weight of the convertible vehicle. Since members constituting the reinforcement 20 other than the pillar-side member 34 are made of aluminum, which has a relatively light specific gravity (at least lighter in specific gravity than iron), the reinforcement 20 is light in weight. This light reinforcement 20 contributes to further prevent an increase in the weight of the convertible vehicle.

The roll bar pillar 38, which is a barrel member but has a predetermined strength, enables formation of an additional load transmitting path extending from the rear side member 18, the gusset 30, the roll bar pillar 38, and the pillar-side member 34 to the center pillar 16. This path contributes to further dispersion of the load inputted into the rear side member 18 in a rear collision, thus further reducing the amount of deformation of the vehicle body.

Moreover, provision of the right-left connecting member 36 connecting the right and left intermediate connecting members 32 enables formation of a load transmitting path from the left rear side member 18, the left gusset 30, the left intermediate connecting member 32, the right-left connecting member 36, the right intermediate connecting member 32, and the right pillar-side member 34 to the right center pillar 16, and also a load transmitting path from the right rear side member 18, the right gusset 30, the right intermediate connecting member 32, the right-left connecting member 36, the left intermediate connecting member 32, and the left pillar-side member 34 to the left center pillar 16.

In this embodiment, since each of the right and left roll bar pillars 38, which constitute the respective right and left end portions of the right-left connecting member 36, is connected to the gusset 30 and the pillar-side member 34, there are formed a load transmitting path from the left rear side member 18, the left gusset 30, the left roll bar pillar 38, the cross member 40, the right roll bar pillar 38, and the right pillar-side member 34 to the right center pillar 16 and a load transmitting path from the right rear side member 18, the right gusset 30, the right roll bar pillar 38, the cross member 40, the left roll bar pillar 38, and the left pillar-side member 34 to the left center pillar 16.

With the above, in the case where a load is unevenly inputted in the right and left directions in a rear collision (for example, in an offset rear collision), the load can be transmitted via the right-left connecting member 36 to the center pillar 16 on a side with a smaller load inputted. For example, in the case where a load is inputted more toward the right side of the vehicle, the load can be transmitted to the left center pillar 16 through the load transmitting path from the right rear side member 18, the right gusset 30, the right intermediate connecting member 32, the right-left connecting member 36, the left intermediate connecting member 32, and the left pillar-side member 34 to the left center pillar 16 or the load transmitting path from the right rear side member 18, the right gusset 30, the right roll bar pillar 38, the cross member 40, the left roll bar pillar 38, and the left pillar-side member 34 to the left center pillar 16, in addition to through the load transmitting path from the right rear side member 18, the right gusset 30, the right intermediate connecting member 32 or the right roll bar pillar 38, and the right pillar-side member 34 to the right center pillar 16. This additional transmission enables further dispersion of the load, and thus further reduction in the amount of deformation of the vehicle body.

Further, since the end portion of the right-left connecting member 36; that is, the roll bar pillar 38, is positioned ahead of the gusset 30, a load from rearward can be readily inputted to the right-left connecting member 36 via the gusset 30. That is, in the case where a load is inputted unevenly in the right and left directions in a rear collision, the load can be more readily inputted in the right-left connecting member 36, which enables more ready transmission of the load in the right-left direction via the right-left connecting member 36.

The wall portion 30c of the gusset 30, the wall portion 32c of the intermediate connecting member 32, and the wall portion 34c of the pillar-side member 34 together constitute a serial wall portion extending from the rear side member 18 to the center pillar 16. Accordingly, a serial (that is, no hollow portion) load transmitting path is formed from the rear side member 18 toward the center pillar 16. This improves the load transmission efficiency.

As described above, the intermediate connecting member 32 is connected to the upper body 12, and the pillar-side member 34 as well is connected to the upper body 12 (the center pillar 16). Meanwhile, the gusset 30 is connected to the under body 14 via the rear side member 18, and the roll bar pillar 38 as well is connected to the under body 14 via the base member 42 and the rear side member 18. Thus, the reinforcement 20 can be described as connecting the upper body 12 and the under body 14. In other words, provision of the reinforcement 20 further strengthens the connection between the upper body 12 and the under body 14, thereby improving the rigidity of the body 10.

The pillar-side member 34, which is a member extending rearward from the center pillar 16, functions so as to prevent deformation of the vehicle in a side collision. As the pillar-side member 34 is made of iron, which is relatively strong (at least stronger than aluminum), or high strength material, the amount of deformation of a vehicle in a side collision can be further reduced.

Although an embodiment according to this disclosure has been described above, this disclosure is not limited to the above described embodiment, and various modifications are possible without departing from the gist of the present disclosure.

The invention claimed is:

1. A vehicle body structure of a convertible vehicle, comprising:
a reinforcement extending in a front-back direction of a vehicle, for connecting a rear side member and a center pillar above a rocker, wherein
an upper end of the rear side member is located further downward with respect to a lower end of the center pillar, and
a front end portion of the reinforcement contacts the center pillar and is connected to the center pillar.

2. The vehicle body structure of a convertible vehicle according to claim 1, wherein
the reinforcement includes
a gusset connected to the rear side member,
a pillar-side member connected to the center pillar, and
an intermediate connecting member disposed between the gusset and the pillar-side member in the front-back direction of the vehicle and connected to the gusset and the pillar-side member.

3. The vehicle body structure of a convertible vehicle according to claim 2, wherein
the gusset, the intermediate connecting member, and the pillar-side member respectively have wall portions extending in the front-back direction of the vehicle, and
the wall portion of the gusset, the wall portion of the intermediate connecting member, and the wall portion of the pillar-side member serially extend in the front-back direction of the vehicle.

4. The vehicle body structure of a convertible vehicle according to claim 3, wherein the reinforcement includes
a left gusset connected to a left rear side member,
a left pillar-side member connected to a left center pillar,
a left intermediate connecting member disposed between the left gusset and the left pillar-side member in the front-back direction of the vehicle and connected to the left gusset and the left pillar-side member,
a right gusset connected to a right rear side member,
a right pillar-side member connected to a right center pillar,
a right intermediate connecting member disposed between the right gusset and the right pillar-side member in the front-back direction of the vehicle and connected to the right gusset and the right pillar-side member, and
a right-left connecting member for connecting the left intermediate connecting member and the right intermediate connecting member.

5. The vehicle body structure of a convertible vehicle according to claim 2, wherein
the reinforcement includes
a left gusset connected to a left rear side member,
a left pillar-side member connected to a left center pillar,
a left intermediate connecting member disposed between the left gusset and the left pillar-side member in the front-back direction of the vehicle and connected to the left gusset and the left pillar-side member,
a right gusset connected to a right rear side member,
a right pillar-side member connected to a right center pillar,
a right intermediate connecting member disposed between the right gusset and the right pillar-side member in the front-back direction of the vehicle and connected to the right gusset and the right pillar-side member, and
a right-left connecting member for connecting the left intermediate connecting member and the right intermediate connecting member.

6. The vehicle body structure of a convertible vehicle according to claim 5, wherein
a left end portion of the right-left connecting member is disposed between the left gusset and the left pillar-side member in the front-back direction of the vehicle and connected to the left gusset and the left pillar-side member, and
a right end portion of the right-left connecting member is disposed between the right gusset and the right pillar-side member in the front-back direction of the vehicle and connected to the right gusset and the right pillar-side member.

7. The vehicle body structure of a convertible vehicle according to claim 2, wherein
the rear side member is connected to a rear end portion of a rocker of the convertible vehicle, and
the intermediate connecting member is connected to a rear wheel well of the convertible vehicle.

8. The vehicle body structure of a convertible vehicle according to claim 1, wherein the reinforcement includes a member extending from one end of the convertible vehicle an opposite end of the convertible vehicle in the vehicle width direction.

9. A vehicle body structure of a convertible vehicle, comprising a reinforcement extending in a front-back direction of a vehicle, for connecting a rear side member and a center pillar above a rocker, wherein
the reinforcement is separable from the center pillar, and
the reinforcement includes
a gusset connected to the rear side member,
a pillar-side member connected to the center pillar, and
an intermediate connecting member disposed between the gusset and the pillar-side member in the front-back direction of the vehicle and connected to the gusset and the pillar-side member, wherein a front end of the gusset is in contact with a rear end of the intermediate connecting member, and
along the front-back direction of the vehicle, the gusset is located further rearward with respect to the pillar-side member.

10. The vehicle body structure of a convertible vehicle according to claim 9, wherein a front end portion of the reinforcement contacts the center pillar and is connected to the center pillar.

11. The vehicle body structure of a convertible vehicle according to claim 9, wherein the reinforcement includes a member extending from one end of the convertible vehicle an opposite end of the convertible vehicle in the vehicle width direction.

12. A vehicle body structure of a convertible vehicle, comprising a reinforcement extending in a front-back direction of a vehicle, for connecting a rear side member and a center pillar above a rocker, wherein
the reinforcement includes
a gusset connected to the rear side member,
a pillar-side member connected to the center pillar, and
an intermediate connecting member disposed between the gusset and the pillar-side member in the front-back direction of the vehicle and connected to the gusset and the pillar-side member,
the gusset, the intermediate connecting member, and the pillar-side member respectively have wall portions extending in the front-back direction of the vehicle, and
the wall portion of the gusset, the wall portion of the intermediate connecting member, and the wall portion of the pillar-side member serially extend in the front-back direction of the vehicle.

\* \* \* \* \*